Oct. 3, 1950
M. K. TAYLOR ET AL
2,524,495
WAVE-SIGNAL RESPONDER SYSTEM
Filed July 15, 1947
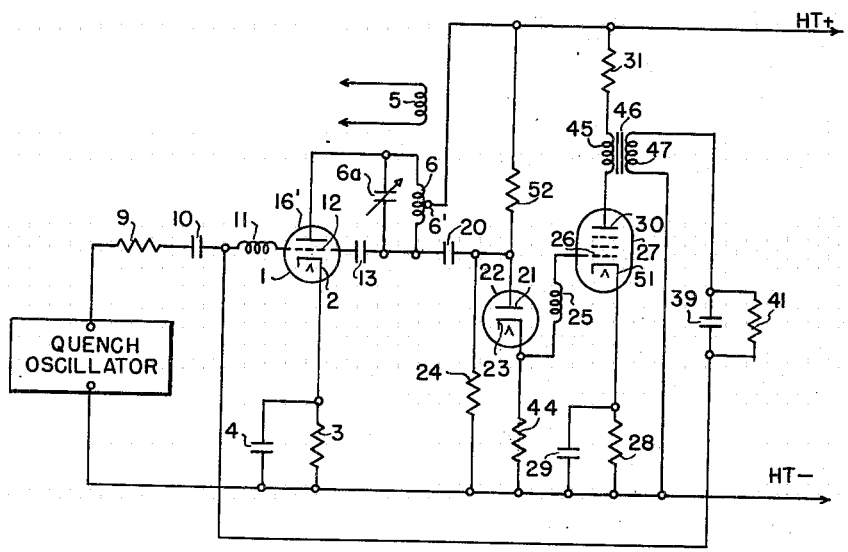
INVENTORS
MAURICE K. TAYLOR
ROBERT S. PAULDEN
BY
*John P. Harvey*
ATTORNEY

Patented Oct. 3, 1950

2,524,495

UNITED STATES PATENT OFFICE 2,524,495

WAVE-SIGNAL RESPONDER SYSTEM

Maurice K. Taylor, Hollinwood, and Robert S. Paulden, Burnage, England, assignors to Ferranti Limited, Hollinwood, England, a corporation of Great Britain Application July 15, 1947, Serial No. 760,960
In Great Britain February 15, 1946

Section 1, Public Law 690, August 8, 1946
Patent expires February 15, 1966

6 Claims. (Cl. 250—17)

This invention relates to apparatus for use in wireless signaling systems of the kind in which a transmitter, having a receiver associated therewith, is arranged to radiate a response signal in reply to an interrogation signal received by such associated receiver.

The invention is more particularly concerned with such receiver-transmitter devices, usually known as "responders" of the type adapted for use with a pulsed interrogating signal and comprising a superregenerative radio receiver associated with transmitting means for the purpose of receiving signal pulses from a remote transmitting station, modifying the wave form of such signal pulses in a manner predetermined in accordance with the nature or identity of the object in which the responder is embodied and then transmitting the modified signal pulses, thereby providing an identification of the nature or identity of the object to a remote station adapted to receive the modified signal pulses. Such a receiver-transmitter device is herein referred to as being "a responder of the type stated."

While the retransmitted response signal pulses from such responders may be radiated at a frequency different from that of the interrogating signal pulses, a common requirement is that such response pulses should always be transmitted at the same frequency as the interrogating signal which initiates their radiation. Under these circumstances it is usual to employ a single tuned circuit for both reception and transmission and it is with this particular form of responder that the present invention is more particularly concerned.

When such a responder of the type stated is operating as a receiver, it is necessary for faithful reproduction of the modulation of the received signals that the free oscillations in the tuned circuit are reduced to negligible proportions within each damping half cycle of the quench frequency, in accordance with the well-known principles of superregenerative amplification. The method usually adopted in superregenerative receivers of normal type for effecting this damping is to connect a low resistance permanently across the tuned circuit. In the case of a responder of the type stated embodying a common tuned circuit for both reception and transmission, however, such a damping resistance, although effective when the equipment is receiving a signal, involves a serious loss of power when the equipment is transmitting a signal, owing to the damping resistance being still connected across the tuned circuit under such transmitting conditions.

The object of the present invention is to provide a responder of the type stated with means for damping the tuned circuit under receiving conditions but not under transmitting conditions.

A wave-signal responder system, in accordance with the present invention, comprises a superregenerative receiver and a transmitting oscillator having a common parallel-resonant frequency-determining circuit. The transmitting oscillator has, during intervals of wave-signal transmission, an oscillation level substantially greater than that of the receiver during intervals of wave-signal reception. The system further comprises a rectifying circuit including a rectifier device and a load resistor. A source of unidirectional potential is applied to the rectifying circuit to render the rectifier device normally conductive. Additionally, there are provided means for coupling the rectifying circuit to the aforementioned resonant circuit to damp the receiver. The last-mentioned means is responsive to the oscillations of the transmitting oscillator substantially to decrease the normal conductivity of the rectifier device and the damping effect thereof during intervals of wave-signal transmission.

In a particular arrangement according to the invention a diode rectifier having its anode connected to the tuned circuit through a condenser has such anode connected to a suitable positive potential by way of a resistance.

For a better understanding of the present invention, together with other and further objects thereof, reference is had to the following description taken in connection with the accompanying drawing, and its scope will be pointed out in the appended claims.

In carrying the invention into effect according to one form shown by way of example in the accompanying drawing, a responder of the type stated includes a triode receiving-transmitting valve 1 forming part of a Hartley-type oscillator, the cathode 2 of the valve being connected to the earthed negative pole of a high-tension supply by way of a biasing resistance 3 and its decoupling condenser 4. The aerial is coupled by a coil 5 to the inductance 6 of a tuned circuit of the oscillator formed by the inductance 6 and parallel-connected variable condenser 6a. The mid-point 6' of the tuning coil is connected to the positive pole of the high-tension supply. The output from a quench-frequency oscillator Q. F. O. is adapted to be fed into the control grid circuit of valve 1 by way of resistance 9, condenser 10, and radio-frequency choke 11.

One end of tuned circuit 6, 6a is connected by way of a condenser 13 to the control grid 12 of valve 1 and by way of a condenser 20 to the anode 21 of diode detector 22. The other end of tuned circuit 6, 6a is connected to the anode 16' of valve 1. Anode 21 and cathode 23 of diode 22 are connected to the negative H. T. supply line by way of resistances 24 and 44, respectively. The cathode 23 of diode 22 is also connected by way of radio-frequency choke 25 to the grid 26 of pentode amplifying valve 27. The cathode 51 of valve 27 is connected to the negative H. T. supply line by the parallel combination of resistance 28 and condenser 29 while the anode 30 of this valve is connected to the positive pole of the high-tension supply by way of transformer primary winding 45 of a transformer 46 and resistance 31. The screen and suppressor grids of this valve are connected in the usual manner for an amplifying valve. One end of secondary winding 47 of transformer 46 is earthed and the other end is connected through the parallel combination of resistance 41 and condenser 39 to the connection between condenser 10 and radio-frequency choke 11.

The responder may differ somewhat from the above. For example, the quench-frequency oscillations may be applied in a different manner, or separate valve for receiving and transmitting may be employed.

In applying the invention to the superegenerative responder described above, anode 21 of diode valve 22 is connected to the positive pole of the high-tension supply by way of a high resistance 52.

In operation, the signal pulses transmitted from a remote, e. g. ground interrogating station are picked up by the aerial and applied by way of coil 5 to the tuned circuit 6, 6a where they are amplified superregeneratively by valve 1. The amplified signals are then rectified by diode valve 22. The rectified pulse signals that appear across resistance 44 are amplified by pentode valve 27, the output from which is applied by way of transformer 46 to the grid 12 of valve 1 in such a sense as to cause violent oscillation by this valve whereby retransmission of such pulses takes place, their duration being increased by the pulse-width controlling circuit 39, 41.

At radio frequencies diode 22 is effectively in parallel with tuned circuit 6, 6a. The flow of diode current caused by the connection of the high-tension positive pole to the diode anode by way of resistance 52 lowers the resistance of the diode and in consequence increases the damping effect of the diode on tuned circuit 6, 6a. When this tuned circuit is oscillating during reception the parallel damping resistance provided by diode 22 is to some extent increased, and the damping effect of the diode on the tuned circuit correspondingly reduced, by the charging up of condenser 20 and the consequent partial blocking of the diode. This, however, is not sufficient to prevent the required damping of the tuned circuit during the damping half cycles of the quench-frequency oscillation when the apparatus is functioning as a receiver.

When on the other hand the apparatus is functioning as a transmitter the oscillations in tuned circuit 6, 6a have a greatly increased amplitude, with the result that condenser 20 quickly charges up to such a high value as substantially to block the diode and so reduce the damping effect thereof to negligible proportions.

It will thus be seen that sufficient damping is applied to the tuned circuit during periods of reception but not during periods of transmission.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A wave-signal responder system comprising: a superregenerative receiver and a transmitting oscillator having a common parallel-resonant frequency-determining circuit, said transmitting oscillator having during intervals of wave-signal transmission an oscillation level substantially greater than that of said receiver during intervals of wave-signal reception; a rectifying circuit including a rectifier device and a load resistor; a source of unidirectional potential applied to said rectifying circuit to render said device normally conductive; and means for coupling said rectifying circuit to said resonant circuit to damp said receiver, said last-mentioned means being responsive to the oscillations of said transmitting oscillator substantially to decrease the normal conductivity of said device and the damping effect thereof during intervals of wave-signal transmission.

2. A wave-signal responder system comprising: a superregenerative receiver and a transmitting oscillator having a common parallel-resonant frequency-determining circuit, said transmitting oscillator having during intervals of wave-signal transmission an oscillation level substantially greater than that of said receiver during intervals of wave-signal reception; a rectifying circuit including a rectifier device and a load resistor; a source of unidirectional potential applied to said rectifying circuit to render said device normally conductive; and means for coupling said rectifying circuit to said resonant circuit to damp said receiver, said last-mentioned means comprising a condenser included in a circuit having a long discharge time constant and constituting with said device a peak rectifier responsive to the oscillations of said transmitting oscillator substantially to decrease the normal conductivity of said device and the damping effect thereof during intervals of wave-signal transmission.

3. A wave-signal responder system comprising: a superregenerative receiver and a transmitting oscillator having a common parallel-resonant frequency-determining circuit, said transmitting oscillator having during intervals of wave-signal transmission an oscillation level substantially greater than that of said receiver during intervals of wave-signal reception; a rectifying circuit including a diode-rectifier device having an anode and including a load resistor; a source of unidirectional potential; a resistor, having a value large with respect to that of said load resistor, coupling said anode to said source to render said device normally conductive; and means for coupling said rectifying circuit to said resonant circuit to damp said receiver, said last-mentioned means comprising a condenser connecting said anode to said resonant circuit and included in a circuit having a long discharge time constant to constitute with said device a peak rectifier responsive to the oscillations of said transmitting oscillator substantially to decrease the normal conductivity of said device and the damping effect thereof during intervals of wave-signal transmission.

4. A wave-signal responder system comprising: a superregenerative receiver and a transmitting oscillator having a common parallel-resonant frequency-determining circuit, said transmitting oscillator having during intervals of wave-signal transmission an oscillation level substantially greater than that of said receiver during intervals of wave-signal reception; a rectifying circuit including a rectifier device and a load resistor; a source of unidirectional potential applied to said rectifying circuit to render said device normally conductive; means for coupling said rectifying circuit to said resonant circuit to damp said receiver, said last-mentioned means being responsive to the oscillations of said transmitting oscillator substantially to decrease the normal conductivity of said device and the damping effect thereof during intervals of wave-signal transmission; and means for deriving a control potential from said rectifying circuit in response to a received signal for controlling said transmitting oscillator to reply to the received signal.

5. A wave-signal responder system comprising: a superregenerative receiver and a transmitting oscillator having a common regenerative system including a parallel-resonant frequency-determining circuit, said transmitting oscillator having during intervals of wave-signal transmission an oscillation level substantially greater than that of said receiver during intervals of wave-signal reception; a rectifying circuit including a rectifier device and a load resistor; a source of unidirectional potential applied to said rectifying circuit to render said device normally conductive; and means for coupling said rectifying circuit to said resonant circuit to damp said receiver, said last-mentioned means being responsive to the oscillations of said transmitting oscillator substantially to decrease the normal conductivity of said device and the damping effect thereof during intervals of wave-signal transmission.

6. A wave-signal responder system comprising: a superregenerative receiver and a transmitting oscillator having a common parallel-resonant frequency-determining circuit, said transmitting oscillator having during intervals of wave-signal transmission an oscillation level substantially greater than that of said receiver during intervals of wave-signal reception; a rectifying circuit including a rectifier device and a load resistor; a source of unidirectional potential applied to said rectifying circuit to render said device normally conductive; means for coupling said rectifying circuit to said resonant circuit to damp said receiver, said last-mentioned means being responsive to the oscillations of said transmitting oscillator substantially to decrease the normal conductivity of said device and the damping effect thereof during intervals of wave-signal transmission; an amplifier for deriving a control potential from said rectifying circuit only in response to a received signal; and means for coupling said amplifier to said transmitting oscillator to control said transmitting oscillator to reply to the received signal.

MAURICE K. TAYLOR.
ROBERT S. PAULDEN.

REFERENCES CITED

The following references are of record in the file of this patent:

UNITED STATES PATENTS

| Number | Name | Date |
|---|---|---|
| 2,414,992 | Wheeler | Jan. 28, 1947 |
| 2,415,667 | Wheeler | Feb. 11, 1947 |
| 2,429,513 | Hansen et al. | Oct. 21, 1947 |